United States Patent [19]
Martinen et al.

[11] Patent Number: 5,353,299
[45] Date of Patent: Oct. 4, 1994

[54] GAS LASER

[75] Inventors: Hinrich Martinen, Reinbek; Hermann Hage, Hamburg, both of Fed. Rep. of Germany

[73] Assignee: Rofin-Sinar Laser GmbH, Hamburg, Fed. Rep. of Germany

[21] Appl. No.: 948,023

[22] Filed: Sep. 21, 1992

[30] Foreign Application Priority Data

Mar. 21, 1990 [DE] Fed. Rep. of Germany ... 9003331[U]

[51] Int. Cl.⁵ .............................................. H01S 3/08
[52] U.S. Cl. ...................................... 372/99; 372/103
[58] Field of Search ............. 372/99, 103, 107, 108, 372/55

[56] References Cited

U.S. PATENT DOCUMENTS

| | | | |
|---|---|---|---|
| 4,872,179 | 10/1989 | Nitsche et al. | 372/99 |
| 4,930,138 | 5/1990 | Opower | 372/99 |
| 5,125,001 | 6/1992 | Yagi et al. | 372/99 |

FOREIGN PATENT DOCUMENTS 0305893  3/1989  European Pat. Off. .

OTHER PUBLICATIONS

"A Novel Stable-Unstable Resonator for Beam Control of Rare-Gas Halide Lasers" O. L. Bourne and P. E. Dyer Nov. 1979, vol. 31, No. 2, pp. 193–196.

"Unstable Optical Resonators" A. E. Siegman Applied Optics, vol. 13, No. 2, Feb. 1974, pp. 353–367.

"Compact, Multipass, Single Transverse Mode $CO_2$ Laser" J. G. Xin and D. R. Hall, Appl. Phys. Lett. 51, vol. 7, Aug. 17, 1987, pp. 469–471.

"$CO_2$ Large-Area Discharge Laser Using an Unstable-Waveguide Hybrid Resonator" P. E. Jackson, H. J. Ballet and D. R. Hall, Appl. Phys. Lett. 54, vol. 20, May 15, 1989, pp. 1950–1952.

*Primary Examiner*—Rodney B. Bovernick
*Assistant Examiner*—Robert E. Wise
*Attorney, Agent, or Firm*—Herbert L. Lerner; Laurence A. Greenberg

[57] ABSTRACT

An electrically excited gas laser includes coaxial hollow-cylindrical electrodes defining a discharge space between the electrodes. A resonator mirror is disposed at each respective end of the discharge space. At least one of the resonator mirrors forms an intersection line with a cylindrical surface being coaxial with the electrodes and the intersection line extends obliquely relative to the circumferential direction. The resonator mirrors form intersection lines with an axial plane of the electrodes and the intersection lines extend substantially at right angles to the axis. At least one of the resonator mirrors extends over only a portion of the circumference of the discharge space.

16 Claims, 2 Drawing Sheets

GAS LASER

CROSS-REFERENCE TO RELATED APPLICATION

This application is a continuation of International Application Ser. No. PCT/DE91/00239, filed Mar. 20, 1991.

SPECIFICATION

The invention relates to an electrically excited gas laser with two electrodes having a spacing being substantially less than the longitudinal and transverse lengths thereof, which enclose a discharge space between them and have spaces oriented toward the discharge space being reflective, and two resonator mirrors each being disposed at one end of the discharge space.

In such a laser which is known from Published European Application No. 0 305 893 A2, corresponding to U.S. Pat. No. 4,939,738, the height of the discharge space is substantially less than its width or length. That has the advantage of permitting heat to be absorbed over a large surface area by the electrodes, from where it can then be dissipated with the aid of suitable coolant liquids and the like. It is then no longer necessary to pump the laser gas through the discharge space by using a special coolant loop. The laser then operates as a stable resonator in planes that are at right angles to the length of the plate and that pass through the two resonator mirrors. In that plane, the relatively low discharge space, with its reflective boundary surfaces (the electrodes), has the properties of an optical wave guide. However, the discharge space does not have such properties in its width, in other words at right angles to that direction, because it is not laterally bounded by corresponding walls and has a width which is much too great for wave guide properties. In that plane, the resonator then operates as an unstable resonator, and the light is no longer reflected back into itself but instead, with various reflections, it creeps or migrates successively in the widthwise direction until it reaches the edge of one resonator mirror and leaves the resonator. Such stable and unstable resonators are known not only from the aforementioned Published European Application but are also described in the literature, such as in an article entitled: A Novel Stable-Unstable Resonator for Beam Control of Rare-Gas Halide Lasers, by O. L. Bourne and P. E. Dyer, in Optics Communications, Vol. 1, No. 2, pp. 193–196.

Lasers of the type described initially above certainly do have advantages. However, their disadvantages are first that such lasers cannot readily be enlarged to attain a higher performance, since the large plane surfaces which are then required cannot be machined with the necessary accuracy. Moreover, such large surfaces are not sufficiently dimensionally stable, so that the wave guide properties are lost. With high-frequency excitation, it is true that one electrode can be grounded. Difficulties arise in shielding the other large-area electrode reliably, so that high frequency can be prevented from undesirably escaping to the outside. Finally, large plates also have the disadvantage of requiring a very great amount of space.

It is accordingly an object of the invention to provide a gas laser, which overcomes the hereinafore-mentioned disadvantages of the heretofore-known devices of this general type and with which a substantially higher laser performance can be obtained without a major effort for construction.

With the foregoing and other objects in view there is provided, in accordance with the invention, an electrically excited gas laser, comprising coaxial hollow-cylindrical electrodes defining a discharge space between the electrodes and ends of the discharge space; two resonator mirrors each being disposed at a respective one of the ends of the discharge space; at least one of the resonator mirrors forming an intersection line with a cylindrical surface being coaxial with the electrodes, the intersection line extending obliquely relative to the circumferential direction; the resonator mirrors forming intersection lines with an axial plane of the electrodes, the intersection lines extending substantially at right angles to the axis; and at least one of the resonator mirrors extending over only a portion of the circumference of the discharge space.

According to the invention, the assumption is a planar discharge space with planar electrodes. The coaxial electrodes have a first advantage which is that even with large dimensions, they are more dimensionally stable than plane surfaces. The necessary accurate machining to obtain a good wave guide is also easier with cylindrical electrodes. If the outer electrode is grounded and the high frequency is applied to the inner electrode, then the outer electrode serves as a shield. Accordingly, the shielding problem becomes simpler. Finally, the configuration of the invention is also distinguished by a more-compact structure.

Since the intersection lines of the first resonator mirror with cylindrical surfaces that are coaxial with the electrodes, and/or the intersection lines of the second resonator mirror with the cylindrical surfaces, extend generally obliquely to the circumferential direction, or in other words as part of a helical line, the laser beam in the unstable mode is offset circumferentially upon each reflection until it emerges at the edge of the other resonator mirror. Since, on the other hand, the intersection lines of the resonator mirrors with axial planes of the electrodes extend substantially at right angles to the axis, a stable mode prevails in these planes.

The shape and configuration of the mirrors can best be explained by imagining the discharge space and the mirrors as being rolled up into one plane. In that case, there are then certain analogies with previously known planar lasers. However, the novelty of the invention is in no way exhausted by having practically cylindrically "rolled up" the previously known planar lasers. If, in fact, such a planar laser were "rolled up", then the plane wave guide geometry with two directions being completely independent of one another (in other words, the plane in which one wave guide is located, and the widthwise direction at right angles thereto) would disappear. Since the known planar discharge space has an infinite thickness, it would be deformed in the "rolling up" process. In other words, the extension of previously parallel lines that were at right angles to the surfaces of the plates would then converge along the axis of the coaxial configuration. One would therefore expect that the independence of the stable mode from the unstable mode in the two directions at right angles to one another would no longer exist. It has not yet been possible to theoretically fully explain whether or not this is the case. In any event, however, the surprising outcome is that with the laser of the invention, equally high performance density is attainable in principle, and then the output performance of the laser can be made greater than with the planar discharge spaces because, as noted, the coaxial electrodes can be produced better and more accurately with substantially larger dimensions.

In accordance with another feature of the invention, if the intersection lines of the first resonator mirror (which is not interrupted in the circumferential direction) with the cylindrical surfaces extend obliquely relative to the circumferential direction, then these intersection lines have a step.

In accordance with a further feature of the invention, the lines where the mirrors intersect with the cylindrical surfaces that are coaxial with the electrodes can have a curvature in these surfaces that is oriented toward the discharge space (concave mirrors) or away from this discharge space (convex mirrors). However, in accordance with an added feature of the invention, it is also possible to dispense with such a curvature, in which case the intersection lines would then be helical, or would be a straight line in the developed cylinder jacket surface. The various options correspond to the most varied known possibilities for the unstable mode in planar discharge spaces, such as that described in an article entitled: Unstable Optical Resonators, by A. E. Siegman, in Applied Optics, 1974, Vol. 13, No. 2, pp. 353–367.

In accordance with an additional feature of the invention, in the axial planes, these intersection lines may be either straight or curved, in such a way that the curvatures are oriented toward the discharge space (concave mirrors). This respectively matches the nonexistent curvature or the focusing curvature of the stable mode.

In accordance with yet another feature of the invention, the thickness of the discharge space is less than 1 cm, since with larger dimensions the wave guide properties are lost.

In accordance with yet a further feature of the invention, the inside diameter of the outer electrode is at least 3 cm.

In accordance with yet an added feature of the invention, the length of the electrodes is advantageously at least 10 cm.

The electrodes must have good wave guide properties. This can be achieved by polishing the metal surface of the electrodes. In accordance with yet an additional feature of the invention, the electrodes are provided with a reflective dielectric coating on the surfaces oriented toward the discharge space. Suitable dielectrics are $AL_2O_3$, for instance, or other known materials. The electrodes could also be produced from a dielectric and merely provided with a metal coating.

In accordance with yet an additional feature of the invention, the electrodes are suitably provided with channels for a coolant. For instance, there could be a flow of distilled water through the inner electrode.

Since the beam has two different divergences in directions at right angles to one another as it emerges from the laser, in accordance with again another feature of the invention, there is provided a substantially cylindrical optical system at an exit location of the laser beam, so that the divergences in two directions at right angles to one another can be adapted, and the beam thereafter can be focused very well.

The laser gas to be excited may be noble gas/halide gases or CO or $CO_2$ may be used, for instance, with which He and $N_2$ are admixed in the usual mixture ratio, and a small proportion of Xe can also be contained in the mixture. The excitation of the gas can be done by coupling-in high frequency, in the range of a few megahertz to several gigahertz, in particular in the range of from 40 to 500 MHz. The gas suitably has a pressure that is lower than atmospheric pressure, suitably between 50 millibars and 500 millibars, although deviations from this pressure range are also possible.

Other features which are considered as characteristic for the invention are set forth in the appended claims.

Although the invention is illustrated and described herein as embodied in a gas laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 3:
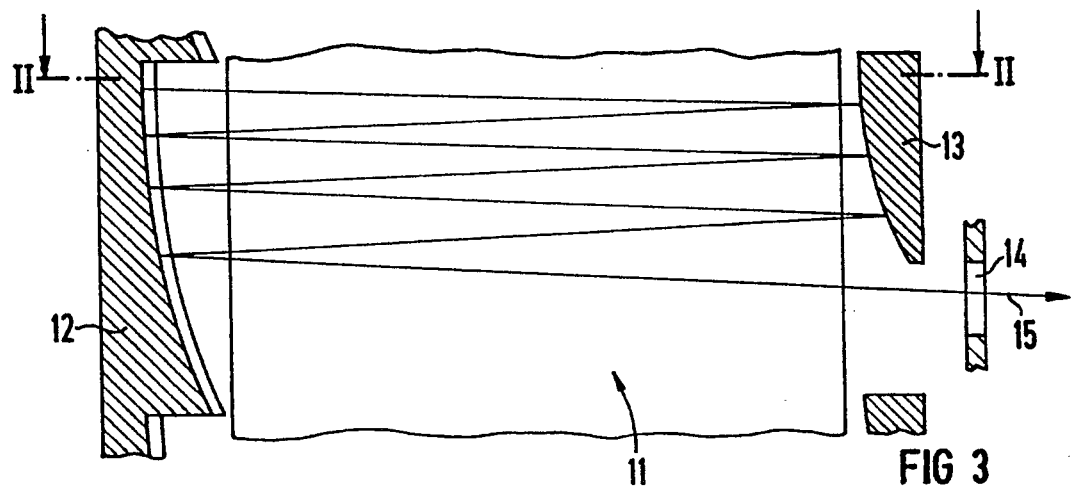
Figure 4:
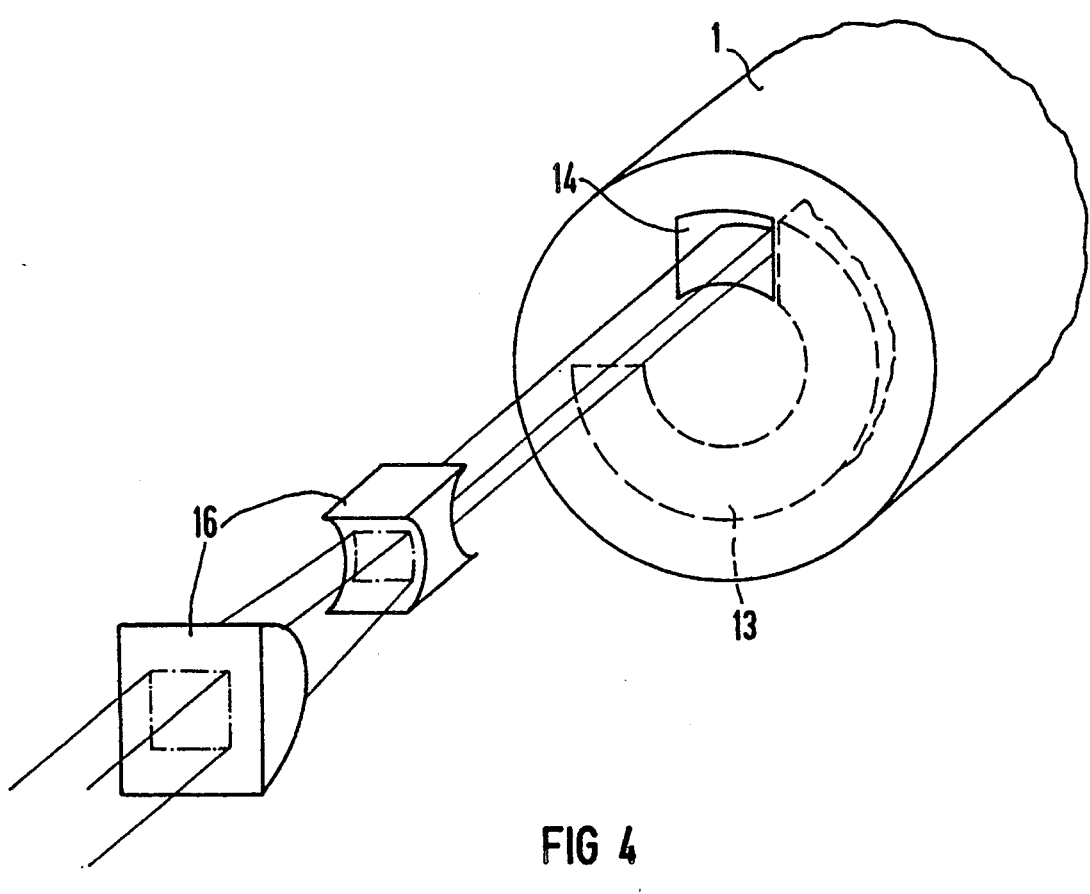

FIG. 3 a fragmentary, cross-sectional view illustrating "unrolling" of the discharge space; and FIG. 4 is a fragmentary, perspective view of the exiting laser beam.

Figure 1:
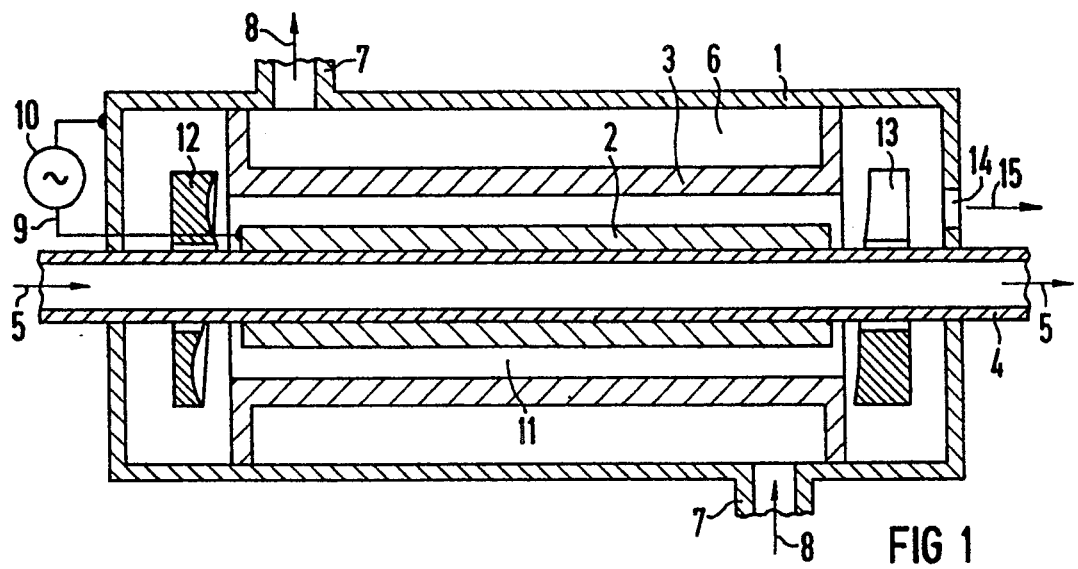
FIG. 1 is a fragmentary, diagrammatic, axial cross-sectional view of a laser according to the invention.

Referring now to the figures of the drawing in detail and first, particularly, to FIG. 1 thereof, there are seen inner and outer cylindrical electrodes 2 and 3 that are disposed coaxially with one another in a housing 1. The inner electrode 2 is located on a tube 4 through which a coolant flows, so that the tube 4 is very well cooled. The coolant, which in particular is distilled water, flows in the direction of arrows 5. The outer electrode 3 is secured to the housing 1 in such a way as to enclose a space or chamber 6 between the outer electrode 3 and the housing 1 through which a coolant, such as water, likewise flows in the direction of arrows 8, through inlet and outlet necks 7. The outer electrode 3 is grounded through the housing 1, while the inner electrode 2 is connected by a lead 9 through non-illustrated adaptation switch elements to a high-frequency generator 10. The surfaces of the metal electrodes 2 and 3 which are oriented or facing toward one another are very accurately machined and polished. The surfaces of the metal electrodes 2 and 3 enclose a discharge space or chamber 11 between them, which normally has a thickness of only a few millimeters. Resonator mirrors 12, 13 are provided on both axial ends of this discharge space 11 and will be described below in more detail in conjunction with FIGS. 2 and 3. The surfaces of the mirrors 12, 13 form intersection lines 12a and 13a, respectively, with a cylindrical surface 20 being coaxial with the electrodes 2, 3. The projections of these intersection lines onto the plane of the drawing are shown in dashed lines. The beam leaves the housing 1 through an exit slot 14 in the direction of an arrow 15.

Figure 2:
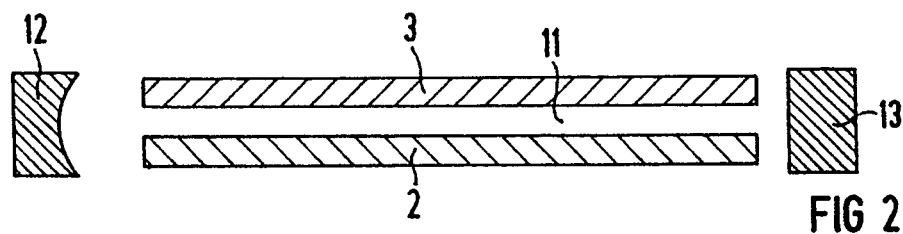
FIG. 2 is a slight enlarged, axial cross-sectional view of a discharge space, which is taken along a line II—II of FIG. 3, in the direction of the arrows.

FIG. 2 substantially shows an axial section of FIG. 1, specifically a lower portion thereof, although on a somewhat larger scale. In this plane, the surface of the left-hand resonator mirror 12 has a concave curvature. In the example shown in FIG. 2, the surface of the right-hand resonator mirror 13 is shown to be planar, which is different from the example shown in FIG. 1, in which the right-hand resonator mirror has a concave surface. Stated more specifically, intersection lines 12b, 13b of the surfaces of the mirrors 12, 13 with the axial plane have that shape. In this plane, a stable mode can develop.

In a direction that is at right angles thereto, which is shown in an unrolled form in FIG. 3, the discharge space is not bounded. In this unrolled plane, the surfaces of the mirrors 12 and 13 have respective concave and convex shapes. The lines 12a and 13a showing the curved surfaces of the mirrors 12 and 13, respectively, represent the unrolled intersection lines 12a and 13a shown in FIG. 1. The center points of the curvatures are offset in such a way that a beam striking one mirror is not reflected into itself but rather creeps or migrates toward the edge of the mirror 13 in zigzag fashion. In this unstable mode, the beam then leaves the laser at the edge of the mirror 13 and exits through an exit slot 14 in the direction of an arrow 15.

As FIG. 4 shows, the laser beam has two different divergences in two directions at right angles to one another, which are the circumferential direction and the radial direction. The beam is then spread in one direction by an axial optical system 16, so that it has the same divergence in both directions at right angles to one another and subsequently can be well focused.

I claim:
1. An electrically excited gas laser, comprising:
   a) coaxial hollow-cylindrical electrodes defining a discharge space between said electrodes and ends of said discharge space; b) two resonator mirrors each being disposed at a respective one of said ends of said discharge space;
   c) at least one of said resonator mirrors forming an intersection line with a cylindrical surface defined coaxially between said electrodes, said intersection line extending obliquely offset from the circumferential direction;
   d) said resonator mirrors forming intersection lines with an axial plane of said electrodes, said intersection lines extending substantially at right angles to the axis; and
   e) at least one of said resonator mirrors extending over only a portion of the circumference of said discharge space.

2. The gas laser according to claim 1, wherein said intersection lines formed by one of said resonator mirrors with the cylindrical surfaces have a step and extend generally obliquely relative to the circumferential direction on both sides of said step.

3. The gas laser according to claim 2, wherein said intersection lines formed by one of said resonator mirrors with the cylindrical surfaces extend on both sides of the step with a curvature oriented toward said discharge space and center points of the curvature being offset in the circumferential direction.

4. The gas laser according to claim 2, wherein said intersection lines formed by one of said resonator mirrors with the cylindrical surfaces on both sides of the step extend with a curvature oriented away from said discharge space and center points of the curvature being offset in the circumferential direction.

5. The gas laser according to claim 1, wherein said intersection lines formed by one of said resonator mirrors with the cylindrical surfaces have a curvature oriented away from said discharge space and center points of the curvature being offset in the circumferential direction.

6. The gas laser according to claim 1, wherein said intersection lines formed by one of said resonator mirrors with the cylindrical surfaces have a curvature oriented toward said discharge space and center points of the curvature being offset in the circumferential direction.

7. The gas laser according to claim 1, wherein said electrodes have axial planes, and at least one of said resonator mirrors forms intersection lines being straight and at right angles to the axis.

8. The gas laser according to claim 1, wherein said electrodes have axial planes, and one of said resonator mirrors forms intersection lines with a curvature oriented toward said discharge space and center points of the curvature being disposed in the middle of said discharge space between said electrodes facing one another.

9. The gas laser according to claim 8, wherein the other of said resonator mirrors forms intersection lines with a curvature oriented toward said discharge space and center points of the curvature being disposed in the middle of said discharge space between said electrodes facing one another.

10. The gas laser according to claim 1, wherein said discharge space has a thickness of less than 1 cm.

11. The gas laser according to claim 1, wherein said outer electrode has an inside diameter of at least 3 cm.

12. The gas laser according to claim 1, wherein said electrodes have a length of at least 10 cm.

13. The gas laser according to claim 1, wherein said electrodes have surfaces facing toward said discharge space and reflective dielectric coatings on said surfaces.

14. The gas laser according to claim 1, wherein said electrodes have conduits for a coolant.

15. The gas laser according to claim 1, including an exit location for a laser beam, and an axial optical system at said exit location.

16. An electrically excited gas laser, comprising:
   a) coaxial hollow-cylindrical electrodes defining a discharge space between said electrodes and ends of said discharge space;
   b) two resonator mirrors each disposed at a respective one of said ends of said discharge space;
   c) at least one of said resonator mirrors forming an intersection line with a cylindrical surface defined coaxially between said electrodes, said intersection line defining a plane, and a normal of said plane extending non-parallel with respect to a cylinder axis of said cylindrical surface;
   d) said resonator mirrors forming intersection lines with an axial plane of said electrodes, said intersection lines extending substantially at right angles to the axis; and
   e) at least one of said resonator mirrors extending over only a portion of the circumference of said discharge space.

* * * * *